(12) United States Patent
Malina (10) Patent No.: US 8,699,159 B1
(45) Date of Patent: Apr. 15, 2014

(54) REDUCING EFFECTS OF WIDE AREA TRACK ERASURE IN A DISK DRIVE

(75) Inventor: James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 65 days.

(21) Appl. No.: 13/525,611

(22) Filed: Jun. 18, 2012

(51) Int. Cl.
*G11B 27/36* (2006.01)

(52) U.S. Cl.
USPC .............................................. 360/31; 360/53

(58) Field of Classification Search
CPC ........................................................ G11B 27/36
USPC ................. 360/31, 53, 54, 55, 39; 369/30.21, 369/57.17, 53.15
See application file for complete search history.

(56) References Cited

U.S. PATENT DOCUMENTS

| | | | |
|---|---|---|---|
| 5,377,058 A | 12/1994 | Good et al. | |
| 6,147,488 A | 11/2000 | Bamba et al. | |
| 6,266,199 B1 | 7/2001 | Gillis et al. | |
| 6,307,817 B1 | 10/2001 | Tsuboi | |
| 6,393,511 B1 | 5/2002 | Albrecht et al. | |
| 6,501,606 B2 | 12/2002 | Boutaghou et al. | |
| 6,570,378 B2 | 5/2003 | Goh et al. | |
| 6,603,617 B1 | 8/2003 | Cross | |
| 6,630,824 B2 | 10/2003 | Richter | |
| 6,697,203 B1 | 2/2004 | Cheng et al. | |
| 6,714,368 B1 | 3/2004 | Himle et al. | |
| 6,898,033 B2 | 5/2005 | Weinstein et al. | |
| 6,987,630 B1 | 1/2006 | Higgins et al. | |
| 7,016,131 B2 | 3/2006 | Liu et al. | |
| 7,038,875 B2 | 5/2006 | Lou et al. | |
| 7,068,449 B2 | 6/2006 | Riddering et al. | |
| 7,068,451 B1 | 6/2006 | Wang et al. | |
| 7,180,692 B1 | 2/2007 | Che et al. | |
| 7,196,860 B2 | 3/2007 | Alex | |
| 7,209,304 B2 | 4/2007 | Seng et al. | |
| 7,253,984 B1 | 8/2007 | Patapoutian et al. | |
| 7,265,933 B1 | 9/2007 | Phan et al. | |
| 7,324,299 B1 | 1/2008 | Schreck et al. | |
| 7,330,324 B2 | 2/2008 | Morinaga et al. | |
| 7,333,290 B1 | 2/2008 | Kupferman | |

(Continued)

FOREIGN PATENT DOCUMENTS

| | | | |
|---|---|---|---|
| JP | 2007179723 A | 7/2007 | |
| JP | 2007293948 A | 11/2007 | |

OTHER PUBLICATIONS

Tsai et al, "Configurable NAND Flash Translation Layer", Proceedings of the IEEE International Conference on Sensor Networks, Ubiquitous, and Trustworthy Computing (SUTC'06), Jun. 5-7, 2006, 8 pages.

(Continued)

*Primary Examiner* — Nabil Hindi (57) ABSTRACT

Apparatus and methods for managing data stored in a disk drive having at least one disk including a first zone of tracks for storing data and a second zone of tracks for storing data, with the second zone being adjacent the first zone. It is determined whether a write counter for the first zone exceeds a threshold value. The write counter for the first zone represents a number of times the first zone has been completely written with data. If it is determined that the write counter for the first zone exceeds the threshold value, the disk drive is controlled to rewrite data from at least a portion of the second zone.

29 Claims, 6 Drawing Sheets

(56) References Cited

U.S. PATENT DOCUMENTS

| | | |
|---|---|---|
| 7,369,340 B1 | 5/2008 | Dang et al. |
| 7,408,731 B2 | 8/2008 | Uemura et al. |
| 7,423,830 B2 | 9/2008 | Ma et al. |
| 7,426,090 B2 | 9/2008 | Yamashita et al. |
| 7,468,854 B2 | 12/2008 | Yamashita et al. |
| 7,477,465 B2 | 1/2009 | Yu |
| 7,483,234 B2 | 1/2009 | Shimozato |
| 7,599,139 B1 | 10/2009 | Bombet et al. |
| 7,715,135 B1 | 5/2010 | Sutardja et al. |
| 7,719,781 B2 | 5/2010 | Ehrlich et al. |
| 7,719,785 B2 | 5/2010 | Taniguchi et al. |
| 7,724,461 B1 | 5/2010 | McFadyen et al. |
| 7,817,372 B2 | 10/2010 | Takahashi |
| 7,830,632 B2 | 11/2010 | Tang et al. |
| 7,835,104 B2 | 11/2010 | Yamashita et al. |
| 7,880,992 B2 | 2/2011 | Ozturk et al. |
| 7,889,448 B2 | 2/2011 | Lu |
| 7,948,704 B2 | 5/2011 | Ellis |
| 7,986,487 B1 | 7/2011 | Madden et al. |
| 7,995,304 B2 | 8/2011 | Ozturk et al. |
| 8,054,573 B2 | 11/2011 | Mathew et al. |
| 8,068,299 B2 * | 11/2011 | Tsunokawa et al. ............ 360/39 |
| 8,098,451 B2 | 1/2012 | Graef |
| 8,139,307 B2 | 3/2012 | Kim et al. |
| 8,169,726 B2 | 5/2012 | Wilson |
| 8,462,454 B1 | 6/2013 | Katchmart |
| 2002/0062470 A1 | 5/2002 | Yang et al. |
| 2002/0063559 A1 | 5/2002 | Richter |
| 2003/0016461 A1 | 1/2003 | Seng et al. |
| 2003/0043491 A1 | 3/2003 | Riddering et al. |
| 2003/0067697 A1 | 4/2003 | Weinstein et al. |
| 2003/0132747 A1 | 7/2003 | Hong et al. |
| 2007/0174582 A1 | 7/2007 | Feldman |
| 2007/0268615 A1 | 11/2007 | McFadyen et al. |
| 2008/0130159 A1 | 6/2008 | Dieron et al. |
| 2008/0165443 A1 | 7/2008 | Moline |
| 2008/0165446 A1 | 7/2008 | Partee |
| 2008/0310043 A1 * | 12/2008 | Masuda et al. ............... 360/53 |
| 2009/0153996 A1 | 6/2009 | Ellis |
| 2009/0195902 A1 | 8/2009 | Moser et al. |
| 2009/0195912 A1 | 8/2009 | Sato |
| 2009/0213486 A1 | 8/2009 | Takahashi |
| 2010/0128386 A1 | 5/2010 | Keizer et al. |
| 2011/0075292 A1 | 3/2011 | New et al. |

OTHER PUBLICATIONS

Seagate Banded Device Feature Set, Slide Presentation F11131, Seagate, Aug. 16, 2011, 16 pages.

* cited by examiner

| Zone | Zone Identifier | Write Counter | Write Pointer | Threshold Value |
|---|---|---|---|---|
| SMR Zone 226 | 0 | 3 | 238 | 9 |
| SMR Zone 228 | 1 | 10 | 240 | |
| SMR Zone 234 | 2 | 4 | 242 | |
| SMR Zone 236 | 3 | 2 | 244 | |

REDUCING EFFECTS OF WIDE AREA TRACK ERASURE IN A DISK DRIVE

BACKGROUND

Disk drives are often used to record data onto or to reproduce data from a recording media. A disk drive can include a rotating magnetic disk and a head actuated over the disk to magnetically write data to and read data from the disk. The disk includes a plurality of radially spaced, concentric tracks for recording user data.

The storage device industry is always trying to increase the recording density of the disk, or in other words, the amount of data that can be stored in a given area on the disk. Shingled magnetic recording (SMR) has recently been introduced as a way of increasing the number of tracks per inch (TPI) by making the tracks narrower. Since it is technologically easier to read narrow tracks than to write narrow tracks, SMR increases TPI by using a relatively wide shingle write head with a stronger magnetic field to overlap tracks like roof shingles. The non-overlapping portion then serves as a narrow track that can be read by a narrower read head.

One problem encountered with disk drives incorporating SMR technology involves wide area track erasure (WATER). WATER results in data being erased from adjacent tracks near a track being written due to interference from the magnetic field of the write head. The problems caused by WATER are exacerbated when tracks are repeatedly rewritten. In addition, disk drives using shingled write heads are ordinarily more susceptible to WATER than conventional disk drives due to the combination of narrower tracks and a wider shingle write head having a stronger magnetic field.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one ordinarily skilled in the art that the various embodiments disclosed may be practiced without some of these specific details. In other instances, well-known structures and techniques have not been shown in detail to avoid unnecessarily obscuring the various embodiments.

Figure 1:
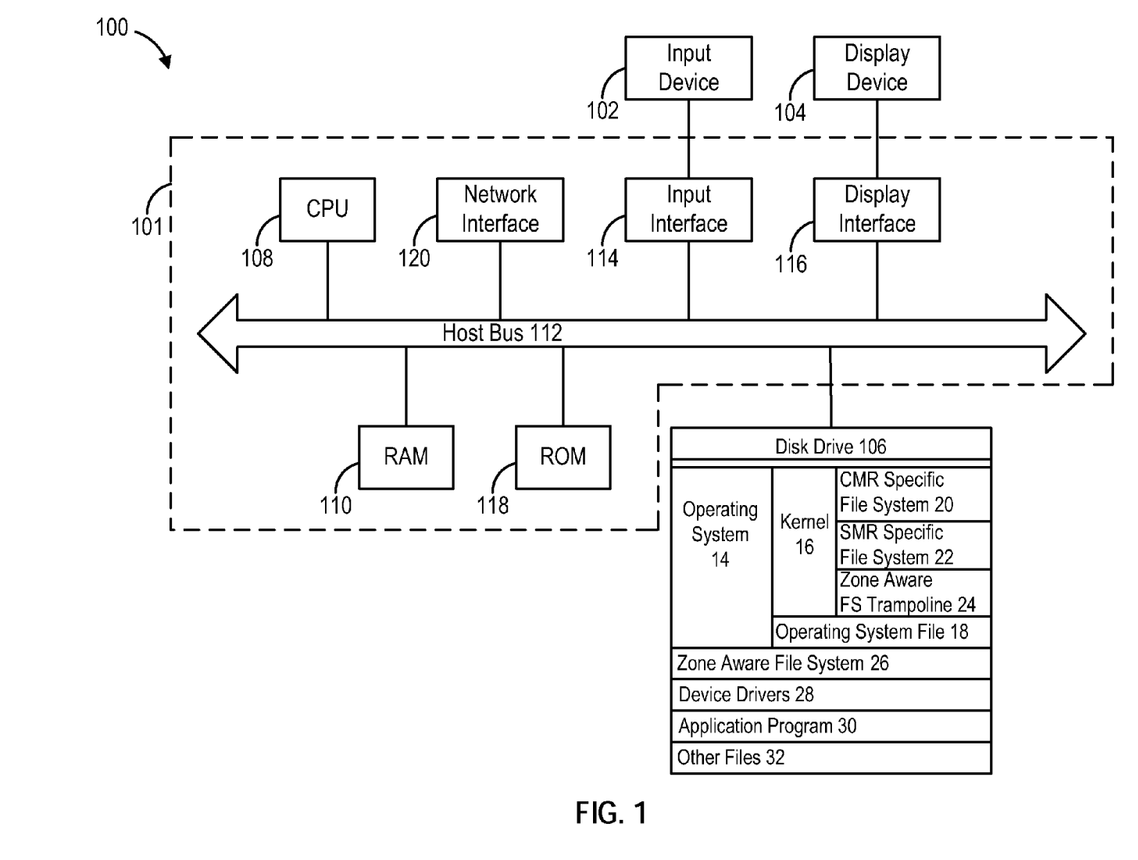
FIG. 1 is a block diagram depicting a computer system including a disk drive according to an embodiment.

FIG. 1 shows computer system 100 which includes host 101, input device 102, display device 104 and disk drive 106. Computer system 100 can be, for example, a distributed file system, cloud storage device, personal computer system, smart phone, or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 104, read only memory (ROM) 118, network interface 120 and disk drive 106.

RAM 110 interfaces with host bus 112 so as to provide information stored in RAM 110 to CPU 108 during execution of instructions in software programs such as operating system 14, application program 30, device drivers 28 and zone aware file system 26. More specifically, CPU 108 first loads computer-executable instructions from disk drive 106 or another storage device into a region of RAM 110. CPU 108 can then execute the stored process instructions from RAM 110. Data such as data to be written to disk drive 106 or data read from disk drive 106 can be stored in RAM 110 so that the data can be accessed by CPU 108 during execution of software programs to the extent that such software programs have a need to access and/or modify the data.

As shown in FIG. 1, disk drive 106 includes application program 30, which can be, for example, a word processing program or a multimedia program. In addition, disk drive 106 includes other files 32 and device drivers 28 for software interfaces to devices such as input device 102, display device 104 and/or disk drive 106.

Disk drive 106 also contains operating system 14, which includes kernel 16 and operating system file 18. In the embodiment of FIG. 1, kernel 16 includes CMR specific file system 20, SMR specific file system 22, and zone aware file system (FS) trampoline 24. These components of operating system 14 are described in more detail in co-pending U.S. application Ser. No. 13/526,241, the contents of which are hereby incorporated by reference.

In the embodiment of FIG. 1, SMR specific file system 22 can manage data stored in disk drive 106 to reduce the effects of WATER. In alternative embodiments, the SMR specific file system 22 described herein can be configured as a part of a device driver, or as a stand-alone application program. Those of ordinary skill in the art will appreciate that the present disclosure is not limited to these embodiments and that the disclosed processes for reducing the effects of WATER may be implemented in other environments for managing data stored on a disk drive. For example, the disclosed processes for mitigating WATER can be implemented using the data management module disclosed in co-pending U.S. application Ser. No. 13/330,156, the contents of which are hereby incorporated by reference.

In this regard, the disclosed contents of disk drive 106 in FIG. 1 are merely an example arrangement and each of the contents of disk drive 106 in FIG. 1 should be seen as optional. For example, and as noted below, the WATER mitigation processes disclosed herein can be performed by a controller of disk drive 106 (e.g., controller 122 of FIG. 2) using firmware of disk drive 106 without involving host 101.

Figure 2:
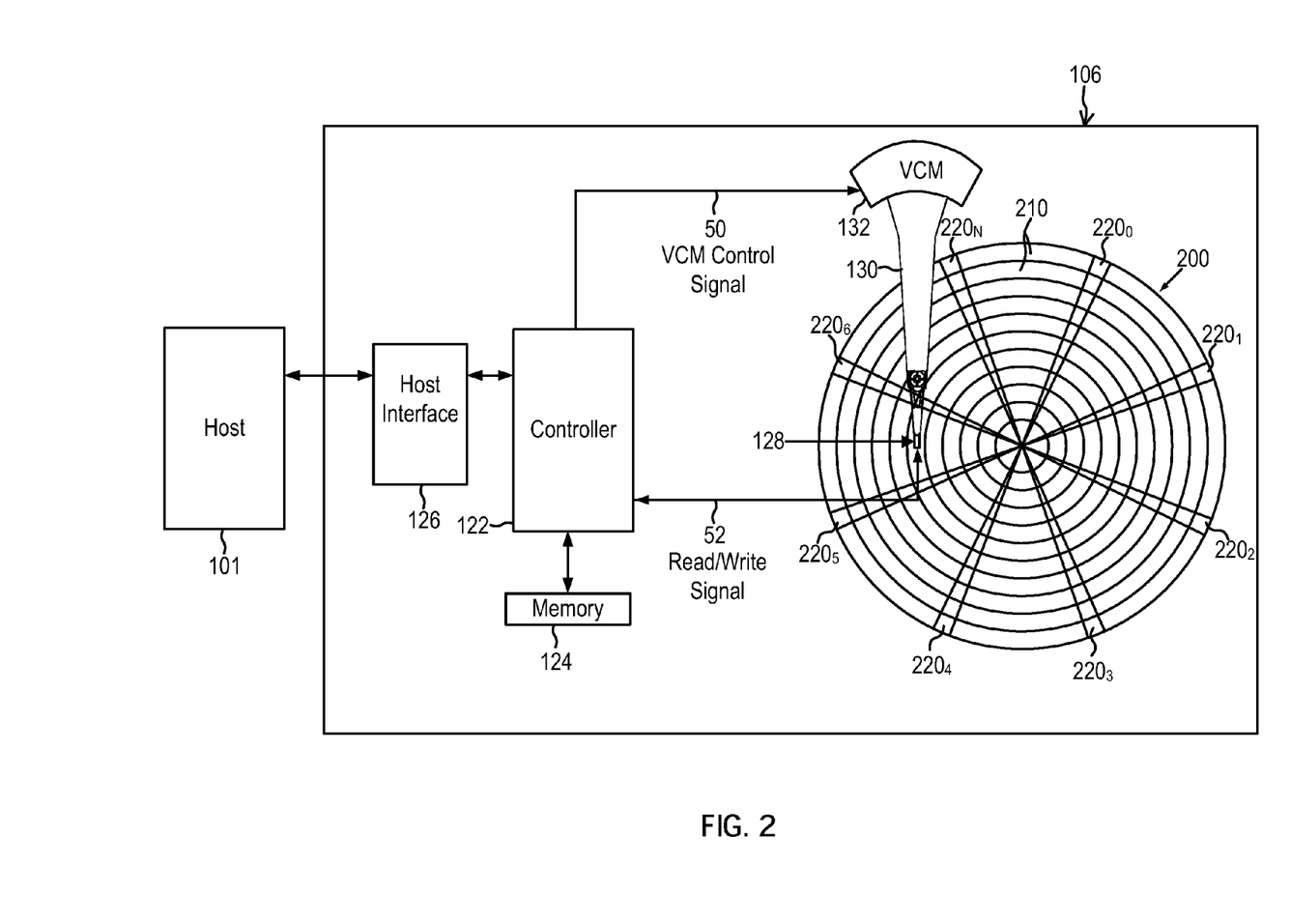
FIG. 2 is a block diagram depicting the disk drive of FIG. 1.

FIG. 2 illustrates a block diagram of disk drive 106 according to one example embodiment. As shown in FIG. 2, disk drive 106 includes rotating magnetic disk 200 and head 128 connected to the distal end of actuator arm 130 which is rotated about a pivot by voice coil motor (VCM) 132 to position head 128 over disk 200. Head 128 includes at least a read element (i.e., read element 134 in FIG. 3) for reading data from disk 200, and a write element (i.e., write element 136 in FIG. 3) for writing data onto disk 200. Disk drive 106 also includes a spindle motor (not shown) for rotating disk 200 during read/write operations.

As shown in FIG. 2, disk drive 106 includes controller 122 which can perform various operations of disk drive 106 described herein. Disk drive 106 also includes memory 124 and host interface 101. Memory 124 can include a volatile memory, such as DRAM, and/or a non-volatile memory for storing data. Data stored in memory 124 includes data read from disk 200, data to be written to disk 200, or instructions for controlling disk drive 106. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

Host interface 126 is configured to interface disk drive 106 with host 101 and may interface according to the serial advanced technology attachment (SATA) standard or other standards such as serial attached SCSI (SAS).

Figure 3:
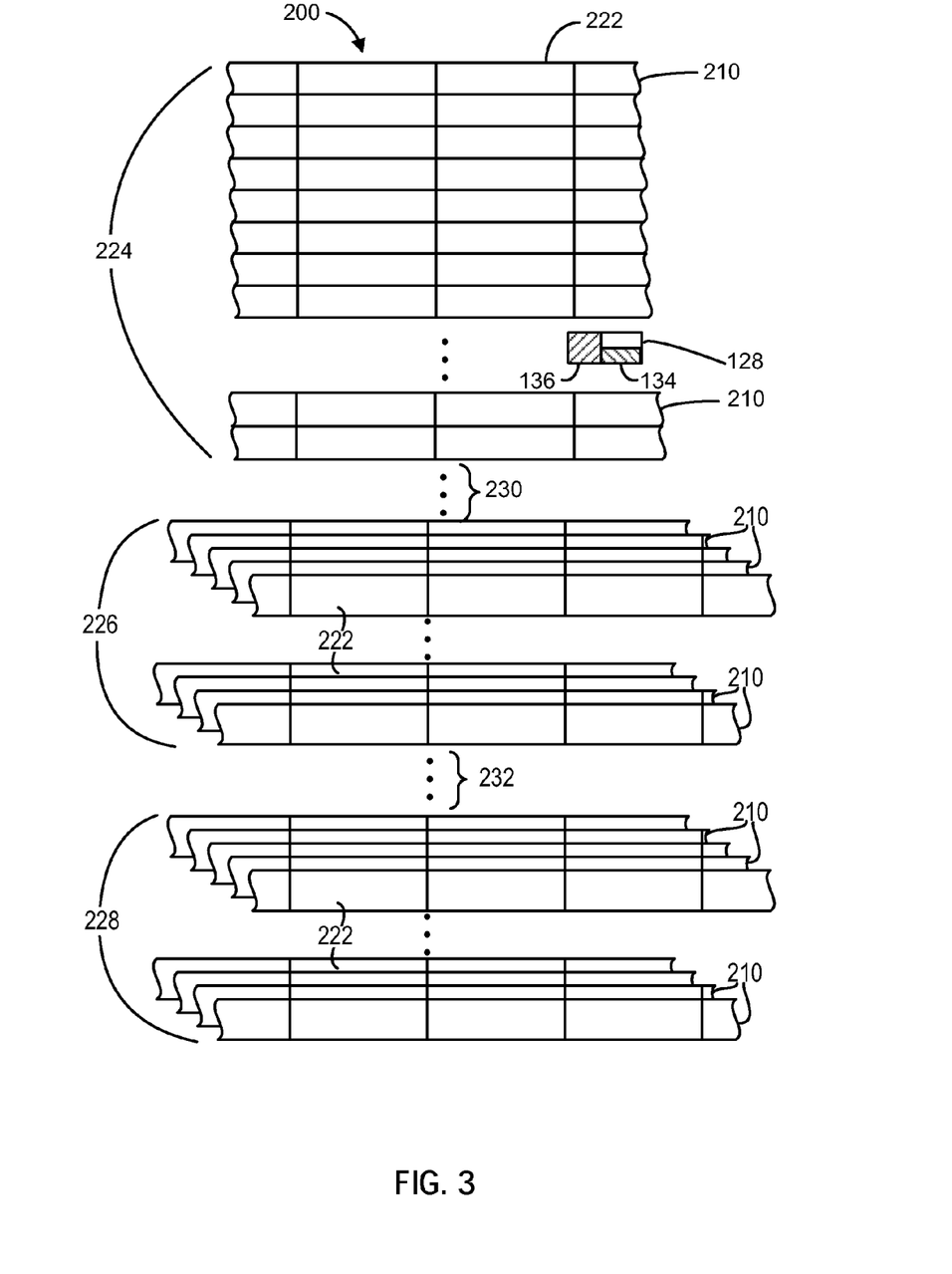
FIG. 3 illustrates a portion of a disk written by a head according to an embodiment.

Disk 200 comprises a number of radial spaced, concentric tracks 210, which are grouped together into zones of tracks (e.g., zones 224, 226 and 228 in FIG. 3). Each track 210 is divided into a number of sectors that are spaced circumferentially along track 210. The sectors may be used to store user data and/or other information. Disk 200 also includes a plurality of angularly spaced servo wedges $220_0$-$220_N$, each of which may include embedded servo information that can be read from disk 200 by head 128 to determine the position of head 128 over disk 200. For example, each servo wedge $220_0$-$220_N$ may include a pattern of alternating magnetic transitions (servo burst), which may be read from disk 200 by head 128 and processed by controller 122 to estimate the position of head 128 relative to disk 200. The angular spacing between servo wedges $220_0$-$220_N$ may be uniform, as shown in the example of FIG. 2.

In operation, controller 122 writes data to and reads data from disk 200 in response to commands from host 101 received via host interface 126. When controller 122 receives a write command from host 101 with data to be written to disk 200, controller 122 temporarily holds the received data in memory 124. To write data to disk 200, controller 122 positions head 128 on disk 200 by sending VCM control signal 50 (e.g., control current) to VCM 132. Controller 122 positions head 128 based on position information read from one or more servo wedges $220_0$-$220_N$. Controller 122 processes data to be written to disk 200 into write signal 52, which is output to head 128. For its part, a write element (shown as write element 136 in FIG. 3) of head 128 converts write signal 52 into a magnetic field that magnetizes the surface of the disk 200 based upon write signal 52, thereby magnetically writing data to disk 200. Controller 122 may notify host 101 via host interface 126 after data for the write command has been successfully written to disk 200.

When controller 122 receives a read command from host 101, requesting data written on disk 200, controller 122 positions head 128 on disk 200 by sending VCM control signal 50 to VCM 132. A read element (shown as read element 134 in FIG. 3) of head 128 generates read signal 52 based upon the magnetization of the disk surface under head 128, and controller 122 processes read signal 52 into data. In one embodiment, the read data is temporarily held in memory 124 before rewriting the read data on disk 200 as part of processes described in more detail below with reference to FIGS. 5 and 6.

To increase the data storage capacity of disk 200, disk drive 106 has the capability to write data to disk 200 using shingled magnetic recording (SMR) so that tracks on disk 200 overlap. More specifically, write element 136 of head 128 is adapted for SMR which means that, among other things, it is wider than read element 134 of head 128. The non-overlapping portions of the overlapping tracks serve as narrow tracks that can be read by narrower read element 134 of head 128.

FIG. 3 illustrates a portion of disk 200 depicting three zones of tracks 210. As shown in the example of FIG. 3, zone 224 is a zone of non-overlapping tracks 210 written by head 128, and zones 226 and 228 are zones of overlapping tracks 210 written by head 128. Zones of non-overlapping tracks, such as zone 224, are referred to herein as a conventional magnetic recording (CMR) zones. Zones of overlapping tracks, such as zones 226 and 228, are referred to herein as SMR zones.

As shown in FIG. 3, each track 210 includes a plurality of sectors 222 for storing a fixed amount of data, such as 2,048 bits, 1,024 bits or 4,096 bits. Head 128 includes read element 134 which generates read signal 52 based upon the magnetization of sectors 222. Head 128 also includes write element 136 which converts write signal 52 into a magnetic field that magnetically writes data in sectors 222. In the example of FIG. 3, write element 136 is approximately twice the width of read element 134 so as to facilitate SMR in SMR zones 226 and 228. In particular, the non-overlapping portions of tracks 210 in SMR zones 226 and 228 form relatively narrow tracks that can be read by read element 134. Accordingly, SMR zones 226 and 228 have a higher number of tracks per inch (TPI) than CMR zone 224. In alternative embodiments, the ratio of the width of the write element to the width of the read element can differ. For example, a write element can be four or five times the width of the read element.

As shown in FIG. 3, SMR zone 226 is separated from CMR zone 224 by gap 230. In addition, SMR zone 226 is separated from SMR zone 228 by gap 232. Gaps 230 and 232 include empty tracks, or tracks without data, that serve as buffers between the zones so as to serve several purposes. In the case of SMR zones 226 and 228, gap 232 allows for the writing of data in SMR zone 226 without overwriting data in a track in adjacent SMR zone 228. SMR zones are generally sequentially written due to the overlapping of the tracks. More specifically, without sequentially writing an SMR zone, the overlapping of tracks can create a problem since new writes to a previously overlapped track would also affect data written in the overlapping track. By having gaps 230 and 232, the zones are separated so as to limit the amount of disk 200 that would need to be sequentially rewritten when only a portion of a particular zone requires rewriting.

In addition, SMR zones are also generally sequentially written to reduce the effect of adjacent track interference (ATI) from write element 136. The magnetic field from write element 136 can affect data in adjacent tracks in either an inside diameter direction or an outside diameter direction of the disk depending on a direction of overlap. Although wider buffers between the zones can better protect data in the zones from the effects of ATI and WATER, the increase in the number of empty tracks in the gaps comes at the expense of decreasing the available data capacity on disk 200 due to a greater number of empty tracks in the gaps.

In the example of FIG. 3, gap 230 can include for example, 10 or 20 empty tracks and gap 232 can include only 1 or 2 tracks. CMR zone 224 can have a wider buffer due to the types of files stored in CMR zone 224. For example, CMR zone 224 can include files that are more frequently modified so that tracks adjacent to CMR zone 224 would be more likely to suffer from WATER. Accordingly, disk 200 can be configured with a relatively wide gap of 10 empty tracks between CMR zone 224 and SMR zone 224 to protect SMR zone 224 from WATER resulting from frequent writing occurring in CMR zone 224. As will be understood by those of ordinary skill in the art, the specific number of empty tracks in gaps 230 and 232 are only illustrative. In alternative embodiments, gaps 230 and 232 may contain different numbers of empty tracks.

While having a relatively small buffer of only one track between SMR zones 226 and 228 facilitates overwriting SMR zone 226 without overwriting data in the first adjacent track of SMR zone 228, the single track of gap 232 is not likely to prevent SMR zone 228 from being affected by WATER with repeated writes in SMR zone 226. Accordingly, one aspect of the present disclosure provides an alternative to having wider buffers between zones while still reducing the effects of WATER.

Figure 4A:
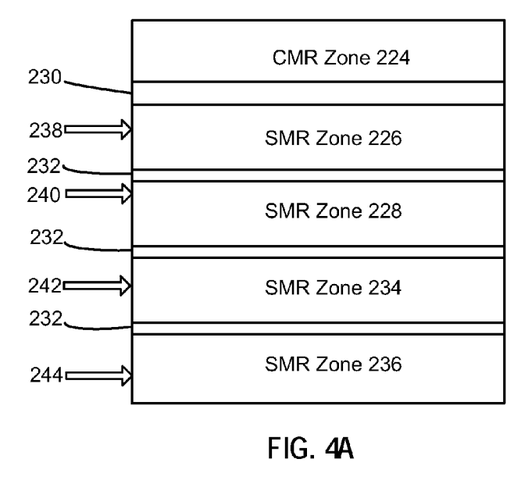
FIG. 4A illustrates a logical arrangement of zones on a disk according to an embodiment.

FIG. 4A illustrates an example of a logical arrangement of CMR zone 224, and SMR zones 226, 228, 234 and 236. In addition, FIG. 4A includes gaps 230 and 232 and write pointers 238, 240, 242 and 244, which are used to facilitate sequential writing of SMR zones 226, 228, 234 and 236, respectively. Write pointers 238, 240, 242 and 244 identify specific sectors 222 where data was last written in their respective zones. When a new write command is received by disk drive 106, controller 122 can control VCM 132 to position write element 136 so that writing occurs in a sector 222 immediately following the sector identified by the write pointer. The write pointers for each SMR zone can be stored, for example, in memory 124 or on disk 200.

As will be appreciated by those of ordinary skill in the art, the arrangement of zones in FIG. 4A is merely one example arrangement of zones. Other arrangements of zones having different quantities and orders of SMR and CMR zones are possible without departing from the spirit and scope of the present disclosure.

Figure 4B:
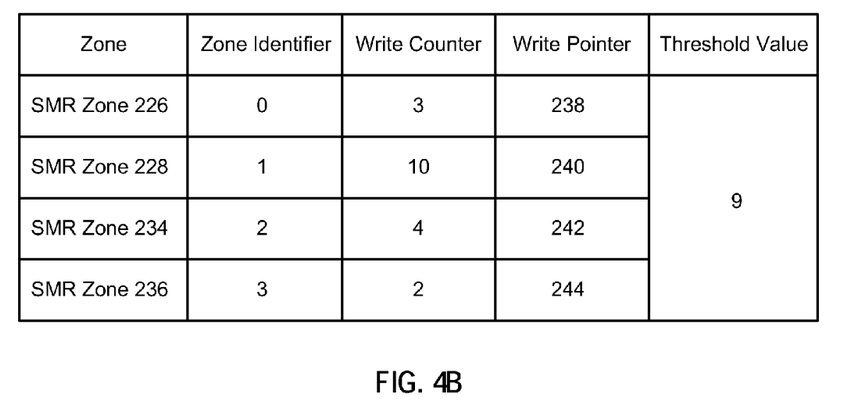
FIG. 4B depicts information stored for SMR zones of FIG. 4A according to an embodiment.

FIG. 4B depicts information stored in memory for SMR zones 226, 228, 234 and 236 according to one embodiment. The information of FIG. 4B can be stored, for example, in memory 124 or on disk 200. Specifically, some of the information of FIG. 4B, such as the write counters, write pointers and zone identifiers may be stored in memory 124, while other information such as the threshold value may be stored on disk 200.

As shown in FIG. 4B, each SMR zone is associated with a zone identifier for uniquely identifying a particular zone. In addition, each SMR zone has a write counter, a write pointer, and a threshold value for the write counter. Each write counter represents a number of times a particular SMR zone has been completely written with data. Once the write pointer for a particular SMR zone reaches the last writable sector in the zone, the write pointer for that zone is incremented.

In the example of FIG. 4B, the counter for SMR zone 228 is reset after rewriting at least a portion of the data in adjacent SMR zones 226 and 234, since the write counter of 10 for SMR zone 228 exceeds the threshold value of 9 for SMR zone 228. By rewriting at least a portion of the data in adjacent SMR zones 226 and 234, it is ordinarily possible to reduce the effects of WATER in SMR zones 226 and 234. In one embodiment, all of the data from SMR zones 226 and 234 can be rewritten back into SMR zones 226 and 234, respectively. In other embodiments, all of the data from SMR zones 226 and/or 234 can be rewritten in a different SMR zone having a relatively low write counter and/or in an SMR zone having the lowest write counter, such as SMR zone 236. However, as will be appreciated by those of ordinary skill in the art, the selection of a zone in which to rewrite the data will also depend upon the space available in the new zone for the rewritten data. The rewriting of data is described in more detail with reference to block 416 of FIG. 5 and block 514 of FIG. 6 below.

The threshold value can be set so as to reduce the likelihood of WATER while considering the operational burden of rewriting adjacent zones. Although SMR zones 226, 228, 234, and 236 in FIG. 4B have a common threshold value of 9, it is possible to have different threshold values for different zones based on considerations such as the number of empty tracks in a particular gap between zones, the TPI of a particular zone, or the bits per inch (BPI) of a particular zone. In addition, other embodiments may also include write counters and threshold values for other types of zones such as CMR zones.

Figure 5:
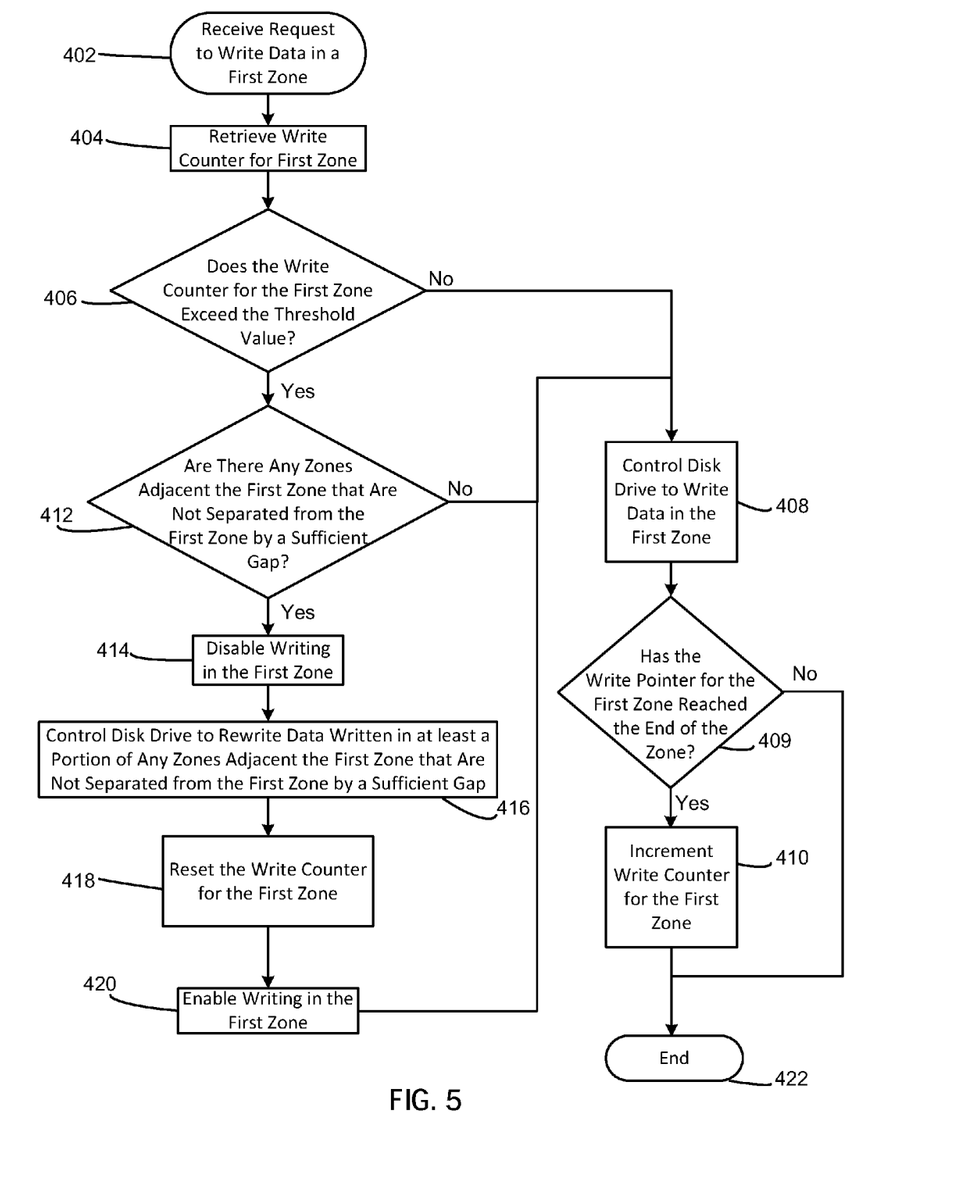
FIG. 5 is a flow chart depicting a process for managing data with respect to a request to write data according to an embodiment.

FIG. 5 depicts an example process for managing data with respect to a new write command. In one embodiment, the process is performed by CPU 108 of host 101 by executing instructions of SMR specific file system 22. In other embodiments, the process of FIG. 5 can be performed by controller 122 of disk drive 106.

In block 402, a request to write data in a first zone is received. The request to write data in the first zone can, for example, emanate from an application program or operating system of host 101, such as application program 30 or operating system 14. In block 404, the process retrieves a write counter for the first zone. In block 406, the process determines whether the write counter for the first zone exceeds the threshold value for the first zone. Referring to the above example of FIG. 4B, a request to write data in SMR zone 228 would cause the process to retrieve the write counter for SMR zone 228 in block 404. In block 406, the process would determine that the write counter of 10 for SMR zone 228 exceeds the threshold value of 9.

With reference to FIG. 5, if it is determined in block 406 that the write counter for the first zone does not exceed the threshold value, disk drive 106 is controlled in block 408 to write data in the first zone. After the data is written in the first zone, the process checks if the write pointer for the first zone has reached the end of the first zone in block 409. If it is determined that the write pointer has not reached the end of the first zone, the process ends in block 422. On the other hand, if it is determined in block 409 that the write pointer has reached the end of the first zone, the write counter is incremented in block 410 for storage on disk drive 106. The process then ends in block 422.

Returning to block 406, if it is determined that the write counter for the first zone exceeds the threshold value, the process checks in block 412 if there are any zones adjacent the first zone that are not separated from the first zone by a sufficient gap. In the example of FIG. 4A, a sufficient gap can indicate a gap of at least 10 tracks, such as for gap 230 between CMR zone 224 and SMR zone 226. In such an example, if it is determined that the write counter for SMR zone 226 exceeds the threshold value, the process would determine in block 412 that there is a second zone, namely SMR zone 228, which is not separated from SMR zone 226 by a sufficient gap. As a further example with reference to FIG. 4B, if SMR zone 228 is the first zone, the process would determine that there are second and third zones that are adjacent the first zone that are not separated by a sufficient gap, namely, SMR zones 226 and 234. In alternative embodiments, block 412 can be optional, if for example, all of the zones of disk 200 are not separated by sufficient gaps such that there will always be adjacent zones not separated from the first zone by a sufficient gap.

In the embodiment of FIG. 5, if the process determines in block 412 that there are not any adjacent zones having an insufficient gap, the process proceeds to block 408. Such a determination could result, for example, from a configuration of disk 200 where the first zone is the first or the last zone on disk 200 and the only adjacent zone is separated from the first zone by a sufficient gap.

If it is determined in block 412 that there is an adjacent zone that is not separated from the first zone by a sufficient gap, writing is disabled in the first zone in block 414 until the write counter for the first zone is reset. As noted above, the process of FIG. 5 can be performed by controller 122 of disk drive 106. In such an embodiment, controller 122 can also generate a WATER limit error indicating the threshold value for the first zone has been exceeded. Controller 122 can then send the WATER limit error to host 101 via host interface 126 to indicate that writing to the first zone has been disabled.

In block 416, disk drive 106 is controlled to rewrite the data written in at least a portion of the zones adjacent the first zone that are not separated from the first zone by a sufficient gap. In more detail, controller 122 of disk drive 106 controls read element 134 to read the data from the adjacent zone or zones and then controls write element 136 to write the data read from the adjacent zone or zones. In rewriting the data, the data in an entire adjacent zone can be rewritten or only a portion of an adjacent zone which may be more susceptible to WATER can be rewritten, such as, for example, the first or last 10 tracks of the adjacent zone. As discussed above with reference to FIG. 4B, the rewritten data may be rewritten into the same zone or may be rewritten into a different zone, such as a zone having a lowest write counter.

In block 418, the process resets the write counter stored in disk drive 106 for the first zone to an initial value, such as 1 or 0. In block 420, writing is enabled in the first zone and the process proceeds to block 408.

Figure 6:
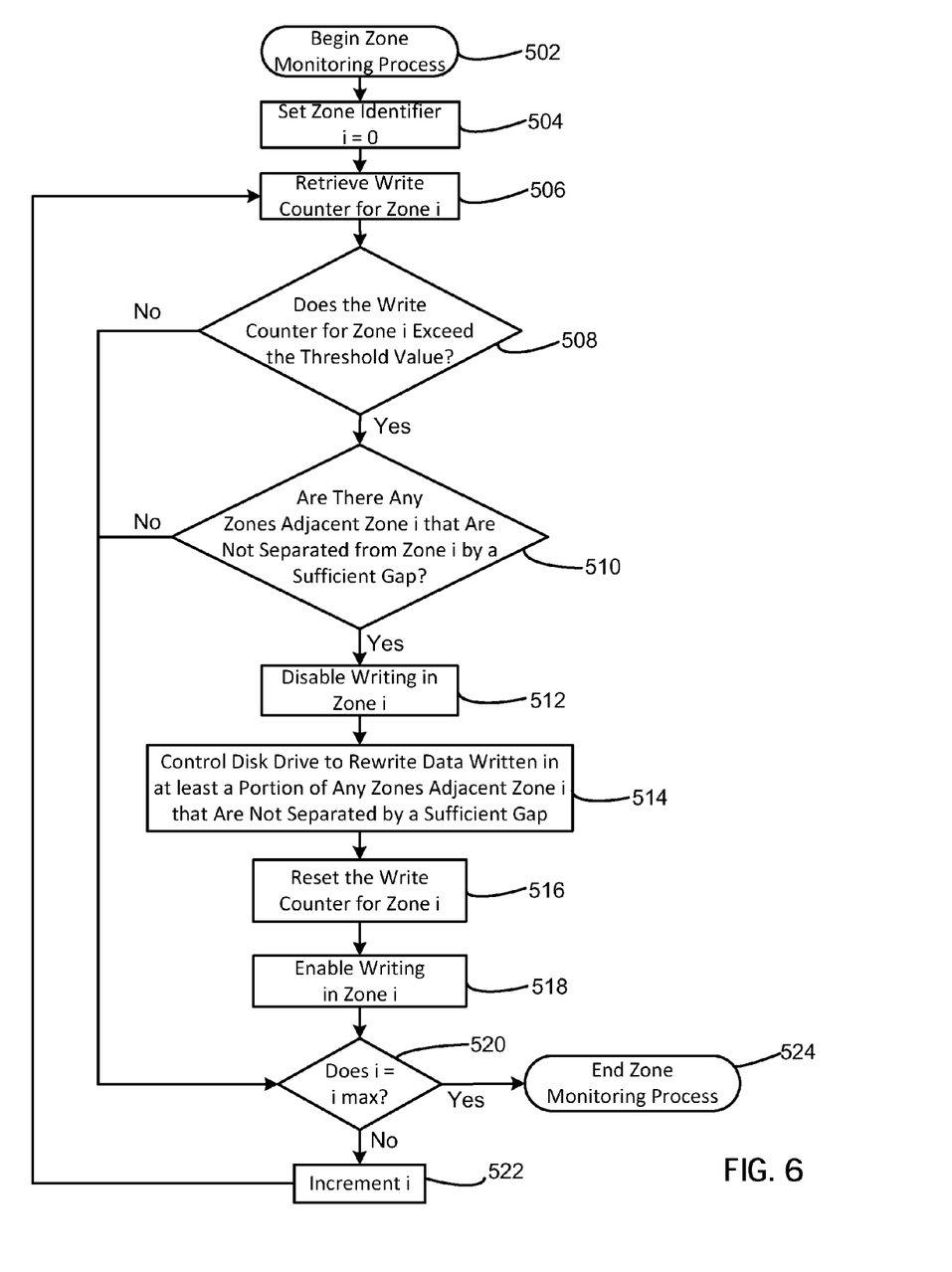
FIG. 6 is a flowchart for a zone monitoring process according to an embodiment.

FIG. 6 depicts an example process for managing data during a zone monitoring process according to one embodiment. In one embodiment, the process is performed by CPU 108 of host 101 by executing instructions of SMR specific file system 22. In other embodiments, the process of FIG. 6 can be performed by controller 122 of disk drive 106.

The zone monitoring process begins in block 502. This process could be initiated at a time when computer system 100 is in an idle state to determine if any of the write counters for zones of disk 200 exceed the threshold value. As described in co-pending U.S. patent application Ser. No. 13/526,241, the state of computer system 100 can be monitored as part of a file system, such as zone aware file system 26, which can include a computer system behavior module.

During the zone monitoring process of FIG. 6, a current zone identifier i is set equal to 0 in block 504. In block 506, the process retrieves the write counter for the zone associated with current zone identifier i. For example, if the current zone identifier is 0, then in the example of FIG. 4B, a write counter of 3 would be retrieved in block 506. In block 508, the process determines whether the retrieved write counter exceeds the threshold value. If it is determined in block 508 that the retrieved write counter does not exceed the threshold value, the process checks in block 520 whether the current zone identifier i equals a maximum number corresponding to the last zone to be checked during the zone monitoring process. If so, the zone monitoring process ends in block 524. On the other hand, if it is determined that the current zone identifier i does not equal the maximum number corresponding to the last zone, the current zone identifier i is incremented in block 522 and the process returns to block 506 to retrieve the write counter for the next zone.

If it is determined in block 508 that the write counter for the current zone i exceeds the threshold value, the process proceeds to block 510 to determine whether there are any zones adjacent the current zone that are not separated from the current zone by a sufficient gap. As described above with reference to FIG. 5, a sufficient gap between zones can be a number of empty tracks that ordinarily reduce the likelihood of WATER in the adjacent zone. If it is determined in block 510 that there are no adjacent zones separated from the current zone by an insufficient gap, the process proceeds to block 520. On the other hand, if it is determined that there are such adjacent zones, the process disables writing in the current zone in block 512 until the write counter for the current zone is reset. As with the process of FIG. 5, the process of FIG. 6 may be performed by controller 122. In such an embodiment, block 512 may further include generating and sending a WATER limit exceeded error to host 101 to indicate that writing in the first zone has been disabled.

In block 514 of FIG. 6, the process controls disk drive 106 to rewrite at least a portion of any adjacent zones identified in block 510. In block 516, the process resets the write counter for the current zone to an initial value after any adjacent zones identified in block 510 have been rewritten. The process then proceeds to block 518 to enable writing in the current zone before proceeding to block 520 to check whether the current zone identifier i equals the maximum number corresponding to the last zone to be checked during the zone monitoring process.

Those of ordinary skill in the art will appreciate that the various illustrative logical blocks, modules, and algorithm steps described in connection with the examples disclosed herein may be implemented as electronic hardware, computer software, or combinations of both. Furthermore, the foregoing algorithm steps can be embodied on a computer readable medium which causes a processor or computer to perform or execute certain functions.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A disk drive, comprising:
   at least one disk including a plurality of tracks for storing data, wherein the plurality of tracks are divided into a plurality of zones including at least a first zone of tracks and a second zone of tracks adjacent the first zone;
   a read element constructed to read data stored in the plurality of tracks;
   a write element constructed to write data in the plurality of tracks;
   a memory storing a plurality of write counters for the plurality of zones, with each write counter representing a number of times a zone of the plurality of zones has been completely written by the write element; and
   a controller configured to:
      retrieve a write counter for the first zone from the memory;
      determine whether the write counter for the first zone exceeds a threshold value during a zone monitoring process, the zone monitoring process being performed to determine whether any of the plurality of write counters stored in the memory exceed the threshold value;
      control the read element to read data stored in at least a portion of the second zone if it is determined that the write counter for the first zone exceeds the threshold value; and
      control the write element to rewrite the data read by the read element from the second zone if it is determined that the write counter for the first zone exceeds the threshold value.

2. The disk drive of claim 1, wherein the controller is further configured to determine whether the write counter for the first zone exceeds the threshold value in response to a request to write data in the first zone.

3. The disk drive of claim 2, wherein the controller is further configured to:
   control the write element to write data in accordance with the request to write data in the first zone if it is determined that the write counter for the first zone does not exceed the threshold value; and
   increment the write counter for the first zone after the write element has written data in the first zone in accordance with the request to write data in the first zone.

4. The disk drive of claim 1, wherein the controller is further configured to control the write element to rewrite the data read by the read element from the second zone in a zone associated with a lowest write counter of the plurality of write counters stored in the memory.

5. The disk drive of claim 1, wherein the at least one disk includes a third zone of tracks adjacent the first zone and on a side of the first zone opposite the second zone, and wherein the controller is further configured to:
   control the read element to read data stored in at least a portion of the third zone if it is determined that the write counter for the first zone exceeds the threshold value; and
   control the write element to rewrite the data read by the read element from the third zone if it is determined that the write counter for the first zone exceeds the threshold value.

6. The disk drive of claim 1, wherein the controller is further configured to:
   disable writing in the first zone until after the rewritten data of the second zone has been rewritten if it is determined that the write counter for the first zone exceeds the threshold value; and
   reset the write counter for the first zone after the rewritten data of the second zone has been rewritten.

7. The disk drive of claim 5, wherein the controller is further configured to:
   disable writing in the first zone until after the rewritten data of the second and third zones have been rewritten if it is determined that the write counter for the first zone exceeds the threshold value; and
   reset the write counter for the first zone after the rewritten data of the second and third zones have been rewritten.

8. A method for managing data stored in a disk drive having at least one disk including a plurality of zones including at least a first zone of tracks for storing data and a second zone of tracks for storing data, wherein the second zone is adjacent the first zone, the method comprising:
   determining whether a write counter for the first zone exceeds a threshold value during a zone monitoring process to determine whether any write counters of a plurality of write counters for the plurality of zones exceed the threshold value, with each write counter representing a number of times a zone of the plurality of zones has been completely written with data; and controlling the disk drive to rewrite data from at least a portion of the second zone if it is determined that the write counter for the first zone exceeds the threshold value.

9. The method of claim 8, further comprising determining whether the write counter for the first zone exceeds the threshold value in response to a request to write data in the first zone.

10. The method of claim 9, further comprising:
controlling the disk drive to write data in accordance with the request to write data in the first zone if it is determined that the write counter for the first zone does not exceed the threshold value; and
incrementing the write counter for the first zone after data has been written in the first zone in accordance with the request to write data in the first zone.

11. The method of claim 8, wherein controlling the disk drive to rewrite data written in at least a portion of the second zone includes rewriting the data from the second zone in a zone associated with a lowest write counter of the plurality of write counters.

12. The method of claim 8, wherein the at least one disk includes a third zone of tracks adjacent the first zone and on a side of the first zone opposite the second zone, and wherein the method further comprises controlling the disk drive to rewrite data from at least a portion of the third zone if it is determined that the write counter for the first zone exceeds the threshold value.

13. The method of claim 8, further comprising:
disabling writing in the first zone until after the rewritten data of the second zone has been rewritten if it is determined that the write counter for the first zone exceeds the threshold value; and
resetting the write counter for the first zone after the rewritten data of the second zone has been rewritten.

14. The method of claim 12, further comprising:
disabling writing in the first zone until after the rewritten data of the second and third zones have been rewritten if it is determined that the write counter for the first zone exceeds the threshold value; and
resetting the write counter for the first zone after the rewritten data of the second and third zones have been rewritten.

15. A non-transitory computer readable medium storing computer-executable instructions for managing data stored in a disk drive having at least one disk including a plurality of zones including at least a first zone of tracks for storing data and a second zone of tracks for storing data, wherein the second zone is adjacent the first zone, and wherein when the computer-executable instructions are executed by a controller or a processor, the computer-executable instructions cause the controller or processor to:
determine whether a write counter for the first zone exceeds a threshold value during a zone monitoring process for determining whether any write counters of a plurality of write counters for the plurality of zones exceed the threshold value, with each write counter representing a number of times a zone of the plurality of zones has been completely written with data; and
control the disk drive to rewrite data from at least a portion of the second zone if it is determined that the write counter for the first zone exceeds the threshold value.

16. The non-transitory computer readable medium of claim 15, wherein the computer-executable instructions further cause the controller or the processor to determine whether the write counter for the first zone exceeds the threshold value is made in response to a request to write data in the first zone.

17. The non-transitory computer readable medium of claim 15, wherein the at least one disk includes a third zone of tracks adjacent the first zone on a side opposite the second zone, and wherein the computer-executable instructions further cause the controller or the processor to control the disk drive to rewrite data from at least a portion of the third zone if it is determined that the write counter for the first zone exceeds the threshold value.

18. A disk drive, comprising:
at least one disk including a plurality of tracks for storing data, wherein the plurality of tracks are divided into at least a first zone of tracks and a second zone of tracks adjacent the first zone;
a read element constructed to read data stored in the plurality of tracks;
a write element constructed to write data in the plurality of tracks;
a memory storing a write counter for the first zone, wherein the write counter represents a number of times the first zone has been completely written with data by the write element; and
a controller configured to:
retrieve the write counter for the first zone from the memory;
determine whether the write counter for the first zone exceeds a threshold value; and
if it is determined that the write counter for the first zone exceeds the threshold value:
control the read element to read data stored in at least a portion of the second zone;
control the write element to rewrite the data read by the read element from the second zone;
disable writing in the first zone until after the rewritten data of the second zone has been rewritten; and
reset the write counter for the first zone after the rewritten data of the second zone has been rewritten.

19. The disk drive of claim 18, wherein the controller determines whether the write counter for the first zone exceeds the threshold value in response to a request to write data in the first zone.

20. The disk drive of claim 19, wherein the controller is further configured to:
control the write element to write data in accordance with the request to write data in the first zone if it is determined that the write counter for the first zone does not exceed the threshold value; and
increment the write counter for the first zone after the write element has written data in the first zone in accordance with the request to write data in the first zone.

21. The disk drive of claim 18, wherein the memory stores a plurality of write counters for a plurality of zones of tracks, with each write counter representing a number of times a zone of the plurality of zones has been completely written by the write element, and wherein the controller is further configured to control the write element to rewrite the data read by the read element from the second zone in a zone associated with a lowest write counter of the plurality of write counters stored in the memory.

22. The disk drive of claim 18, wherein the at least one disk includes a third zone of tracks adjacent the first zone and on a side of the first zone opposite the second zone, and wherein the controller is further configured to:
control the read element to read data stored in at least a portion of the third zone if it is determined that the write counter for the first zone exceeds the threshold value; and control the write element to rewrite the data read by the read element from the third zone if it is determined that the write counter for the first zone exceeds the threshold value.

23. The disk drive of claim 22, wherein the controller is further configured to:
disable writing in the first zone until after the rewritten data of the second and third zones have been rewritten if it is determined that the write counter for the first zone exceeds the threshold value; and
reset the write counter for the first zone after the rewritten data of the second and third zones have been rewritten.

24. A method for managing data stored in a disk drive having at least one disk including a first zone of tracks for storing data and a second zone of tracks for storing data, wherein the second zone is adjacent the first zone, the method comprising:
determining whether a write counter for the first zone exceeds a threshold value, wherein the write counter for the first zone represents a number of times the first zone has been completely written with data; and
if it is determined that the write counter for the first zone exceeds the threshold value:
controlling the disk drive to rewrite data from at least a portion of the second zone;
disabling writing in the first zone until after the rewritten data of the second zone has been rewritten if it is determined that the write counter for the first zone exceeds the threshold value; and
resetting the write counter for the first zone after the rewritten data of the second zone has been rewritten.

25. The method of claim 24, wherein the determination of whether the write counter for the first zone exceeds the threshold value is made in response to a request to write data in the first zone.

26. The method of claim 25, further comprising:
controlling the disk drive to write data in accordance with the request to write data in the first zone if it is determined that the write counter for the first zone does not exceed the threshold value; and
incrementing the write counter for the first zone after data has been written in the first zone in accordance with the request to write data in the first zone.

27. The method of claim 24, wherein controlling the disk drive to rewrite data written in at least a portion of the second zone includes rewriting the data from the second zone in a zone associated with a lowest write counter of a plurality of write counters for a plurality of zones of tracks with each write counter representing a number of times a zone of the plurality of zones has been completely written.

28. The method of claim 24, wherein the at least one disk includes a third zone of tracks adjacent the first zone and on a side of the first zone opposite the second zone, and wherein the method further comprises controlling the disk drive to rewrite data from at least a portion of the third zone if it is determined that the write counter for the first zone exceeds the threshold value.

29. The method of claim 28, further comprising:
disabling writing in the first zone until after the rewritten data of the second and third zones have been rewritten if it is determined that the write counter for the first zone exceeds the threshold value; and
resetting the write counter for the first zone after the rewritten data of the second and third zones have been rewritten.

* * * * *